2,403,684

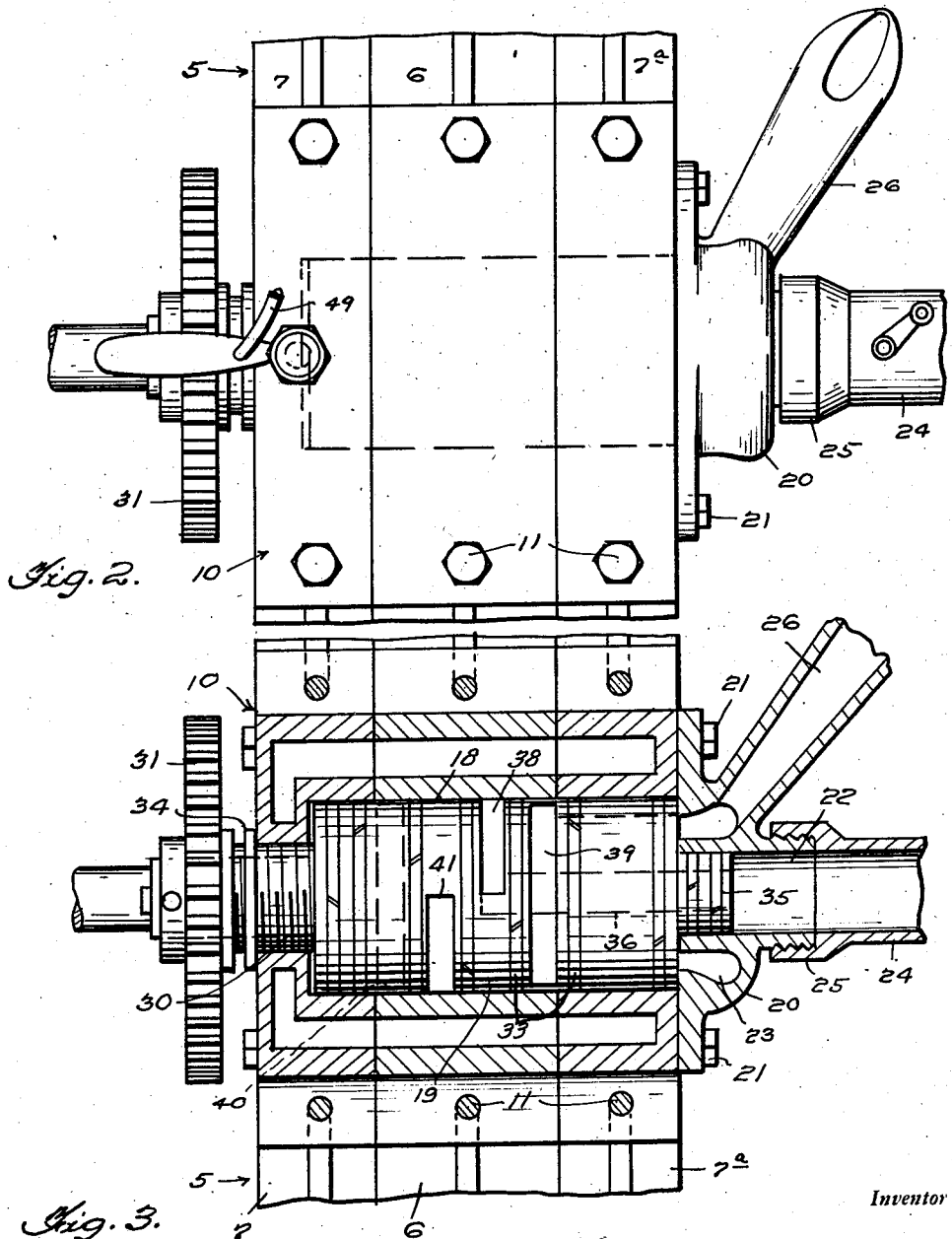

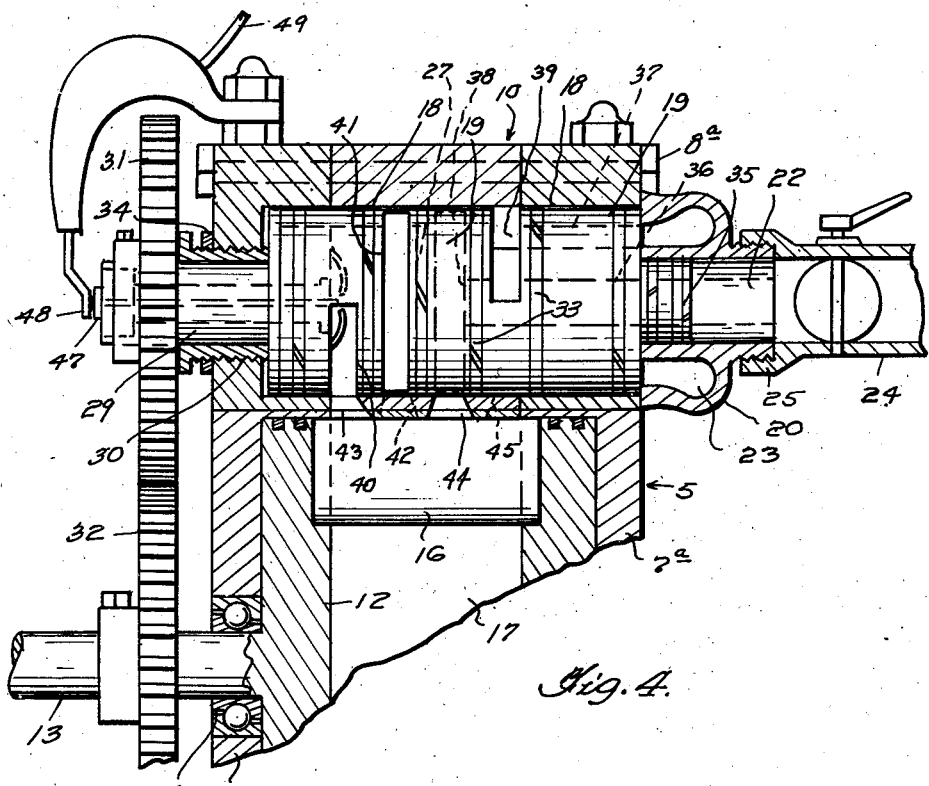
Fig. 4.
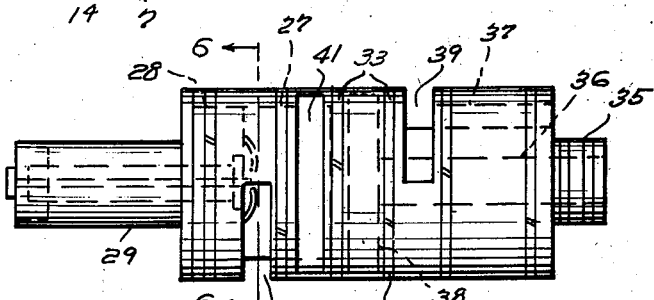
Fig. 5.
Fig. 6.
Inventor
EVERETT W. RICH,

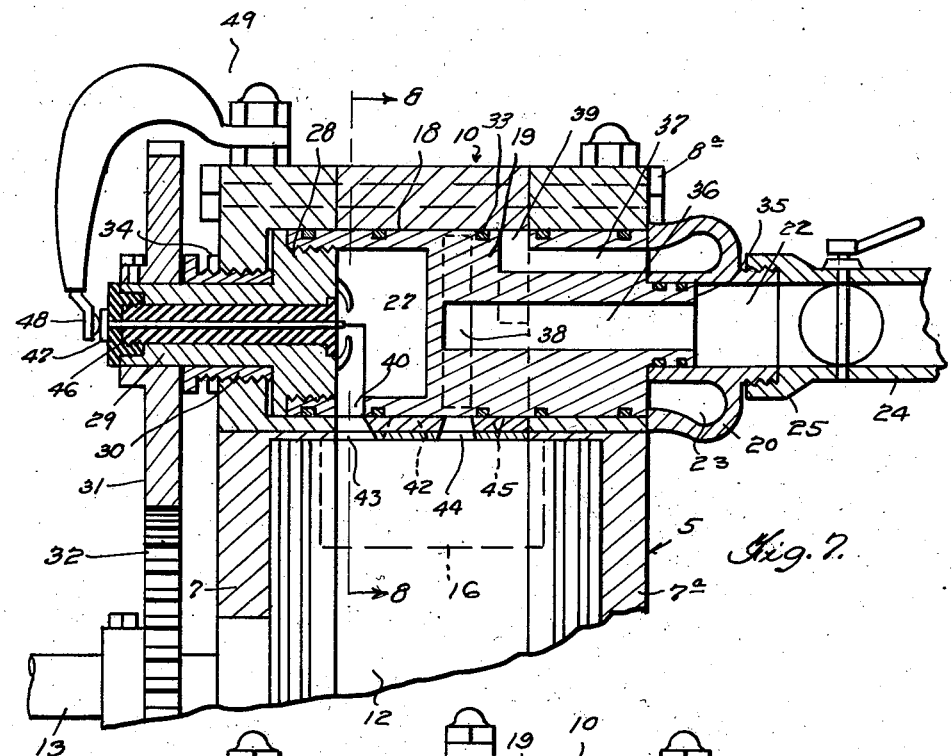
Fig. 7.
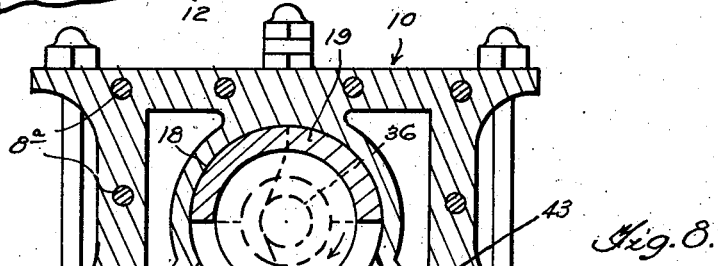
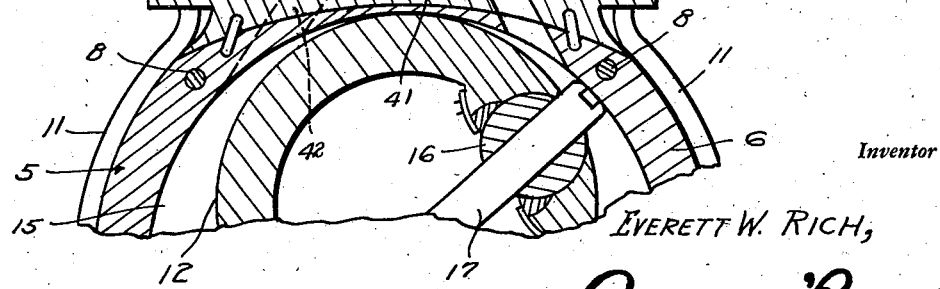
Fig. 8.
Inventor
EVERETT W. RICH,
By Clarence A. O'Brien
and Harvey B. Jacobson
Attorneys Patented July 9, 1946

UNITED STATES PATENT OFFICE 2,403,684

ROTARY COMBUSTION ENGINE

Everett W. Rich, San Diego, Calif.

Application August 17, 1944, Serial No. 549,948

1 Claim. (Cl. 123—16)

The present invention relates to new and useful improvements in rotary combustion engines of the type disclosed in my co-pending application Serial No. 548,437, filed August 7, 1944.

The primary object of the present invention is to simplify and improve the construction and operation of rotary combustion engines of the above kind by providing a single rotary valve in the engine head, which rotary valve is provided with the combustion chamber and controls the supply of explosive charges to the engine housing for compression, the supply of compressed charges from the engine housing to the combustion chamber of the valve, the discharge of exploded charges from the combustion chamber into the housing, and the exhaust of spent gases from the housing to the exhaust pipe of the engine.

A more specific object of the invention is to provide a construction of the above kind in which the spark plug for igniting the explosive charges in the combustion chamber is carried by and rotates with the rotary valve.

More specific features and advantages of the invention will become apparent from the following description when considered in connection with the accompanying drawings; and the invention consists in the novel form, combination and arrangement of parts hereinafter more fully described, shown in the drawings and claimed.

In the drawings, wherein like reference characters indicate corresponding parts throughout the several views:

Figure 2 is a fragmentary top plan view thereof.

Figure 3 is a fragmentary horizontal section taken on line 3—3 of Figure 1.

Figure 4 is a fragmentary vertical section taken substantially on line 4—4 of Figure 1, with the rotary valve in elevation.

Figure 5 is an elevational view of the rotary valve per se.

Figure 6 is a transverse section taken on line 6—6 of Figure 5.

Figure 7 is a view similar to Figure 4, but with the rotary valve in central longitudinal section.

Figure 8 is a fragmentary transverse section taken substantially on line 8—8 of Figure 7.

Figure 1:
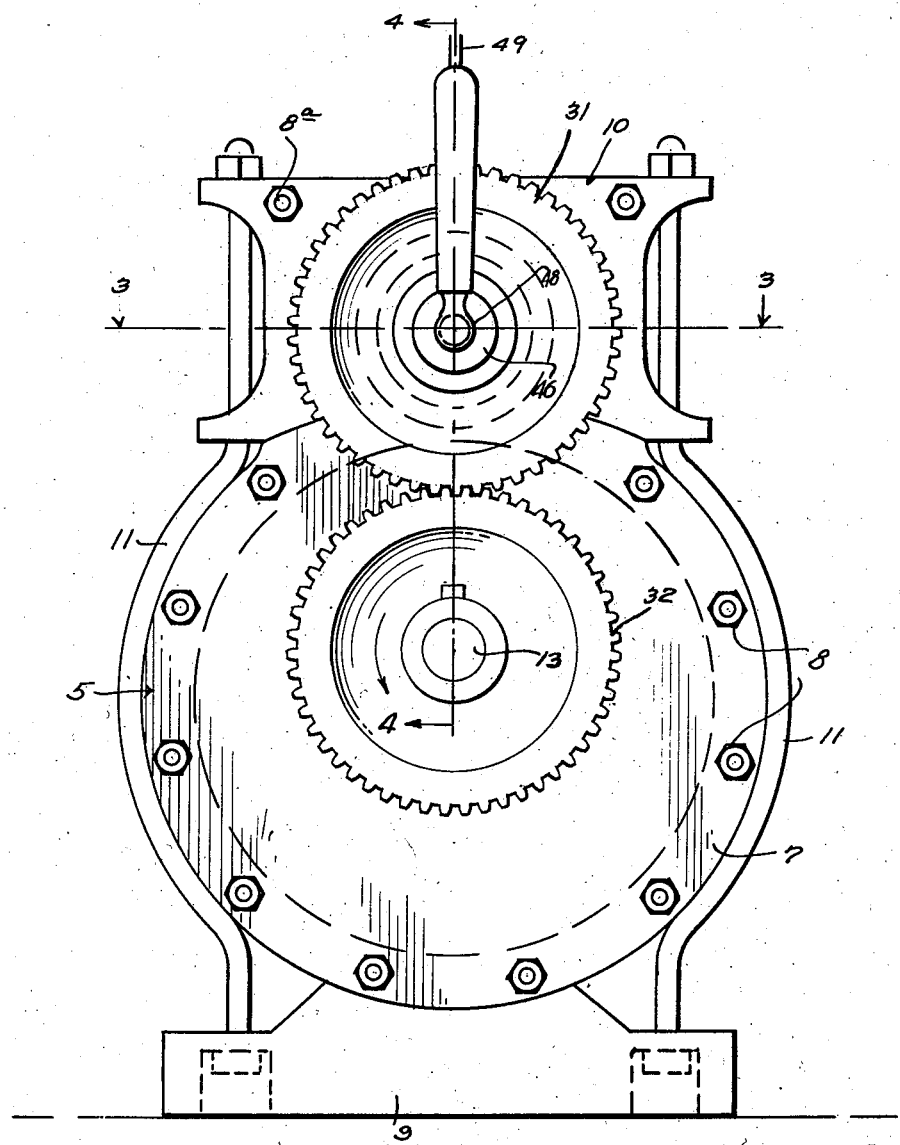
Figure 1 is a side elevational view of a rotary combustion engine constructed in accordance with the present invention.

Referring in detail to the drawings, the present engine includes a housing 5 preferably composed of an intermediate section 6 and end sections 7 and 7a bolted together, as at 8, and formed to include base portions 9.

Mounted on top of the housing 5 is a head 10 that is preferably divided vertically to correspond to the sections of the housing, the sections of the head being similarly bolted together, as at 8a. Rods 11 secure the housing and head sections in assembled relation.

A rotary piston 12 is mounted eccentrically in the housing 5 and fixed on one end of a shaft 13 which is journaled in an off-center bearing 14 provided therefor in the end section 7 of the housing 5. The eccentric arrangement of piston 12 in the housing 5 provides the usual crescent-shaped compression and power chamber 15 within said housing, and slidable through rocking bearings of the piston 12 are radially movable vanes as shown in my above-mentioned co-pending application and in Italian Patent No. 249,539 of July 28, 1926, one of said bearings being indicated at 16 and one of said vanes being indicated at 17 in Figure 8.

In accordance with the present invention, the head 10 is formed centrally between its sides with a relatively large horizontal substantially cylindrical chamber 18 in which is rotatably fitted a substantially cylindrical valve 19. The chamber 18 and valve 19 preferably taper slightly from right to left of Figure 4, and the chamber 18 is open at the end at the right of said Figure 4. At this end of the chamber 18, a combined intake and exhaust fitting 20 is bolted, as at 21 (Fig. 3) to the head 10, which fitting includes an axial intake passage 22 and a surrounding exhaust chamber 23. Explosive charges are supplied to the intake passage 22 by means of a pipe 24 leading from a suitable carburetor and connected to a nipple of fitting 20, as at 25. The exhaust chamber 23 communicates with an exhaust pipe 26. At the left end of valve 19, as viewed in Figures 4 and 7, said valve is formed with a combustion chamber 27 that is closed at its outer side by a removable plug 28 provided on one end of a tubular shaft 29 journaled in a bushing 30 threaded in an opening of the head 10 provided axially of the valve chamber. The shaft 29 projects at this side of the head and has a gear 31 secured thereon which meshes with another gear 32 secured on the projecting shaft 13 of the piston 12. Obviously, this provides a driving means for the rotary valve when the engine is in operation. By adjusting bushing 30 outwardly into engagement with gear 31, the valve 19 may be drawn to the left of Figure 4 so as to snugly seat said tapered valve 19 in its tapered chamber 18. Valve 19 is provided on its periphery and at suitable points with packing rings 33, and a lock nut 34 may be threaded on bushing 30 to secure it in adjusted position. At the other or right end, as viewed in Figure 4, the valve 19 has an axial hollow reduced portion 35 that is journaled in the central portion of the fitting 20 and also provided with peripheral packing rings. At the right end, as viewed in Figure 7, the valve 19 has an axial intake passage 36 and a second longitudinal passage 37 at one side of said passage 36. The inner end of passage 36 communicates with a peripheral arcuate port 38 provided in the valve 19 adjacent the combustion chamber 27, while the inner end of passage 37 communicates with another peripheral arcuate port 39 of the valve 19. The valve 19 also has two other arcuate peripheral ports 40 and 41 which communicate with the combustion chamber 27, and it will be noted that the ports are successively staggered 90° about the periphery of the valve 19. Provided in the head 10 and housing 5 is a passage 42 located in the plane of the port 41 and arranged to conduct exploded gases from the combustion chamber 27 to the compression and power chamber 15 of the housing. At the opposite side of the valve, the head 10 and housing 5 has a similar passage 43 located in the plane of the port 40 of the valve and arranged to conduct compressed charges from the chamber 15 of the housing to the combustion chamber 27. A further passage 44 is provided in the head 10 and housing 5 at the same side of the valve as the passage 43, and this passage 44 is arranged in the plane of the port 38 of the valve so as to conduct fuel charges from the passage 36 to the chamber 15 of the housing for compression. Still another passage 45 is provided in the head 10 and housing 5 at the same side of the valve as the passage 42, and this passage 45 is in the plane of the port 39 of valve 19 for conducting spent or exhaust gases from the housing chamber 15 to the exhaust passage 37 for ultimate discharge into chamber 23 and then outwardly through exhaust pipe 26.

For igniting the compressed explosive charges within the combustion chamber 27 at the proper intervals, suitable ignition means is provided including a spark plug 46 fitted and secured within the hollow shaft 29 of the valve 19, said spark plug having its points exposed within the chamber 27 and provided at its outer end with a contact head 47 constantly engaged by a brush 48 mounted on the head 10 and connected with the ignition wire 49. In this way a constant electrical connection is provided between the wire 49 and the feed terminal of the spark plug, while allowing the spark plug and valve to rotate in the operation of the engine.

As the piston 12 rotates, the valve 19 is driven so as to register port 38 with passage 44 and admit an explosive charge to the housing chamber 15 in advance of one of the vanes 17 of the engine. Continued rotation of piston 12 causes the explosive charge to be compressed, whereupon the valve 19 will have turned to a position wherein the port 40 has registered with the passage 43 for admitting the compressed charge from the housing chamber 15 to the combustion chamber 27. The compressed charge is then immediately fired in the chamber 27 and the port 41 simultaneously registers with passage 42 so as to permit the expanding gases to pass from the combustion chamber into the chamber 15 of the housing behind the succeeding vane 17 for driving the piston 12. As the piston continues to rotate, the valve 19 will have its port 39 registered with the passage 45, thereby permitting the spent gases to pass from the housing chamber 15 and outwardly through the exhaust pipe 26 by way of passage 37 and chamber 23. The ports of the valve are in overlapping relation, as shown, so that when a charge is admitted for compression in advance of one vane, spent exhaust gases are being discharged from in front of the other vane. In other words, high efficiency is had by overlapping the ports as do the valve operations of ordinary high speed four-cycle engines. The described cycle of operation is rapidly repeated so as to provide a substantially continuous drive for the power shaft 13, as will be apparent to those skilled in the art.

From the foregoing description, it will be seen that I have provided a very efficient and simplified construction wherein a single rotary valve controls the admission of charges to be compressed, the passage of the compressed charges to the combustion chamber, the passage of the exploded gases from the combustion chamber to the compression and power chamber of the housing, and the discharge of exhaust gases from the chamber of the housing to the exhaust pipe, said single rotary valve further having the combustion chamber formed therein. Minor changes in details of construction illustrated and described are contemplated, such as fall within the spirit and scope of the invention as claimed.

What I claim is:

In a rotary combustion engine, a circular housing, an eccentric piston rotatable in the housing, a head mounted on the housing, a single rotary valve journaled in the head and having a combustion chamber therein, said head, housing and valve having cooperating ports and passages for successively controlling the admission of fuel charges to the housing for compression, passage of the compressed charges from the housing to the combustion chamber for firing, passage of the exploded gases from the combustion chamber to the housing, and discharge of the spent gases from the housing to the atmosphere, means for firing the compressed charges within the combustion chamber, and a driving connection between the piston and said valve, said valve having two longitudinal passages in an end portion thereof, each communicating at its inner end with a different port of the valve, a fitting secured to the head and including a central intake passage communicating with one passage of the valve and a surrounding exhaust chamber communicating with the other passage of the valve, a charge supplying pipe coupled to the fitting in communication with the first-named passage of the latter, and an exhaust pipe leading from the exhaust chamber of said fitting.

EVERETT W. RICH.